US008880992B2

(12) United States Patent
Gray et al.

(10) Patent No.: US 8,880,992 B2
(45) Date of Patent: Nov. 4, 2014

(54) METHOD AND APPARATUS FOR ANIMATING TRANSITIONS BETWEEN SEARCH RESULTS

(75) Inventors: Matthew Gray, Reading, MA (US); Alison Cichowlas, Boston, MA (US); Greg Harris Plesur, Arlington, MA (US); Marcin Wichary, San Francisco, CA (US); Thomas Colthurst, Somerville, MA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/346,958

(22) Filed: Jan. 10, 2012

(65) Prior Publication Data

US 2013/0179762 A1      Jul. 11, 2013

(51) Int. Cl.
*G06F 17/21*      (2006.01)

(52) U.S. Cl.
USPC .......................................................... 715/205

(58) Field of Classification Search
USPC .......................................................... 715/205
See application file for complete search history.

(56) References Cited

U.S. PATENT DOCUMENTS

| | | | | |
|---|---|---|---|---|
| 7,219,090 | B2 * | 5/2007 | Travis, Jr. ............................... | 1/1 |
| 7,580,945 | B2 * | 8/2009 | Liu ......................................... | 1/1 |
| 7,827,254 | B1 * | 11/2010 | Nevill-Manning et al. ... | 709/218 |
| 7,890,526 | B1 * | 2/2011 | Brewer et al. ................... | 707/767 |
| 8,201,107 | B2 * | 6/2012 | Chevalier et al. ............. | 715/861 |
| 8,577,911 | B1 * | 11/2013 | Stepinski et al. ............. | 707/765 |
| 2006/0047649 | A1 * | 3/2006 | Liang ................................ | 707/4 |
| 2006/0200455 | A1 * | 9/2006 | Wilson .............................. | 707/4 |
| 2007/0112759 | A1 * | 5/2007 | Kulakow et al. .................. | 707/5 |
| 2007/0198486 | A1 * | 8/2007 | Abrams et al. .................... | 707/3 |
| 2008/0071831 | A1 * | 3/2008 | Reddy ........................ | 707/104.1 |
| 2008/0072166 | A1 * | 3/2008 | Reddy ........................... | 715/764 |
| 2008/0072180 | A1 * | 3/2008 | Chevalier et al. ............. | 715/861 |
| 2008/0183699 | A1 * | 7/2008 | Hu et al. ........................... | 707/5 |
| 2008/0201304 | A1 * | 8/2008 | Sue ................................... | 707/3 |
| 2010/0010971 | A1 * | 1/2010 | Eyal et al. ........................ | 707/3 |
| 2011/0191314 | A1 * | 8/2011 | Howes et al. ................. | 707/706 |
| 2011/0238690 | A1 * | 9/2011 | Arrasvuori et al. ........... | 707/769 |
| 2011/0314372 | A1 * | 12/2011 | Teevan et al. ................ | 715/255 |
| 2012/0150837 | A1 * | 6/2012 | Radlinski et al. ............. | 707/708 |
| 2012/0303604 | A1 * | 11/2012 | Eyal et al. ..................... | 707/706 |
| 2013/0007587 | A1 * | 1/2013 | Marantz et al. ............... | 715/234 |
| 2013/0024394 | A1 * | 1/2013 | Yamahara ..................... | 705/347 |
| 2013/0127877 | A1 * | 5/2013 | Blas et al. ..................... | 345/474 |
| 2013/0132818 | A1 * | 5/2013 | Anders et al. ................. | 715/234 |

FOREIGN PATENT DOCUMENTS

| WO | WO9957656 A9 | 1/2000 |
|---|---|---|
| WO | 2006127758 A2 | 11/2006 |

OTHER PUBLICATIONS

Paek, Tim, Susan Dumais, and Ron Logan. "WaveLens: A new view onto internet search results." in Proceedings of the SIGCHI conference on Human factors in computing systems, pp. 727-734. ACM, 2004.*

Notification of Transmittal of the International Search Report and the Written Opinion of the International Searching Authority for PCT/US2013/020820, mailing date Mar. 13, 2013, 16 pages.

(Continued)

*Primary Examiner* — Frank D Mills
(74) *Attorney, Agent, or Firm* — Fish & Richardson P.C.

(57) ABSTRACT

The technology described relates to animated transitions between consecutive sets of search engine results.

21 Claims, 11 Drawing Sheets

(56) References Cited

OTHER PUBLICATIONS

Dork M et al., "VisGets: Coordinated Visualizations for Web-based Information Exploration and Discovery", IEEE Transactions of Visualizatio and Computer Graphics, IEEE Service Center, Los Alamitos, CA, US vol. 14, No. 6 (Nov. 1, 2008), pp. 1205-1212, XP011248506, ISSN: 1077-2626.

* cited by examiner

METHOD AND APPARATUS FOR ANIMATING TRANSITIONS BETWEEN SEARCH RESULTS

BACKGROUND

Consecutive web searches by a client replace the results of the old search query with the search results of the new search query. When the new search query includes a switch to a new search corpus, it can be unclear whether the new search results are related to the old search results. Similarly, when the new search query has a refinement of a query term—for example, a spelling correction, a new query term, a related query term, or other query refinement—it is again unclear how the refinement reorders or otherwise modifies the search results.

SUMMARY

The technology disclosed relates to a method of visually indicating relationships between different sets of search results. The different search results include a first plurality of search results responsive to a first search engine query from a client system, and a second plurality of search results responsive to a second search engine query from the client system.

In one implementation, a server sends instructions to the client system. The instructions are executable by the client system to indicate results common to the first plurality of search results and the second plurality of search results with an animated transition of the hyperlinks moving along paths having origins at positions of the hyperlinks in the first plurality of search results and destinations at positions of the hyperlinks in the second plurality of search results. An example of a result is a hyperlink to a hyperlinked Uniform Resource Locator.

In another implementation, the client system indicates the results common to the first plurality of search results and the second plurality of search results with an animated transition of the hyperlinks moving along paths having origins at positions of the hyperlinks in the first plurality of search results and destinations at positions of the hyperlinks in the second plurality of search results. An example of a result is a hyperlink to a hyperlinked Uniform Resource Locator. An example of a client system includes a browser extension which indicates the results.

In yet another implementation, a non-transitory computer readable medium has instructions stored thereon which, when executed by one or more computers, cause the one or more computers to perform operations to visually indicating relationships between the different sets of search results. The computer executable instructions indicate the results common to the first plurality of search results and the second plurality of search results with an animated transition of the hyperlinks moving along paths having origins at positions of the hyperlinks in the first plurality of search results and destinations at positions of the hyperlinks in the second plurality of search results. An example of a result is a hyperlink to a hyperlinked Uniform Resource Locator.

Various embodiments include one or more of the following features, which can be performed by the client system or the server or in combination.

The hyperlinked Uniform Resource Locators common to the first plurality of search results and the second plurality of search results are identified. The identified hyperlinked Uniform Resource Locators are indicated by the animated transition.

Various hyperlinked Uniform Resource Locators are omitted from the animated transition, for example those that fail to refer to a distinct web document, and/or those that generate an additional plurality of search results.

The animated transition from the first plurality of search results to the second plurality of search results reduces visual discontinuity, for example, by changing a visual appearance of an animated element to match a destination hyperlink in the second plurality of search results prior to the animated element reaching the destination hyperlink.

The first search engine query and the second search engine query are directed at different search corpuses, and the animated transition indicates the hyperlinks to hyperlinked Uniform Resource Locators common to the different search corpuses.

Comparison accuracy among hyperlinked Uniform Resource Locators of the first plurality of search results and the second plurality of search results is increased by removing parameters from the hyperlinked Uniform Resource Locators.

Within the first plurality of search results and within the second plurality of search results, multiple instances of a same hyperlinked Uniform Resource Locator are searched to select one of the multiple instances for the animated transition. This selection has various alternatives. For example, in the animated transition, a Document Object Model tree element enclosing the multiple instances of the same hyperlinked Uniform Resource Locator is animated. In another example, in response to finding a first Document Object Model tree element that encloses the multiple instances of the same hyperlinked Uniform Resource Locator and that also encloses a different hyperlinked Uniform Resource Locator, a second Document Object Model tree element at a lower level than the first Document Object Model tree element is animated. In a further alternative, text-only instances of the same hyperlinked Uniform Resource Locator are favored over non-text-only instances of the same hyperlinked Uniform Resource Locator for use in the animated transition.

DETAILED DESCRIPTION

Figure 1:
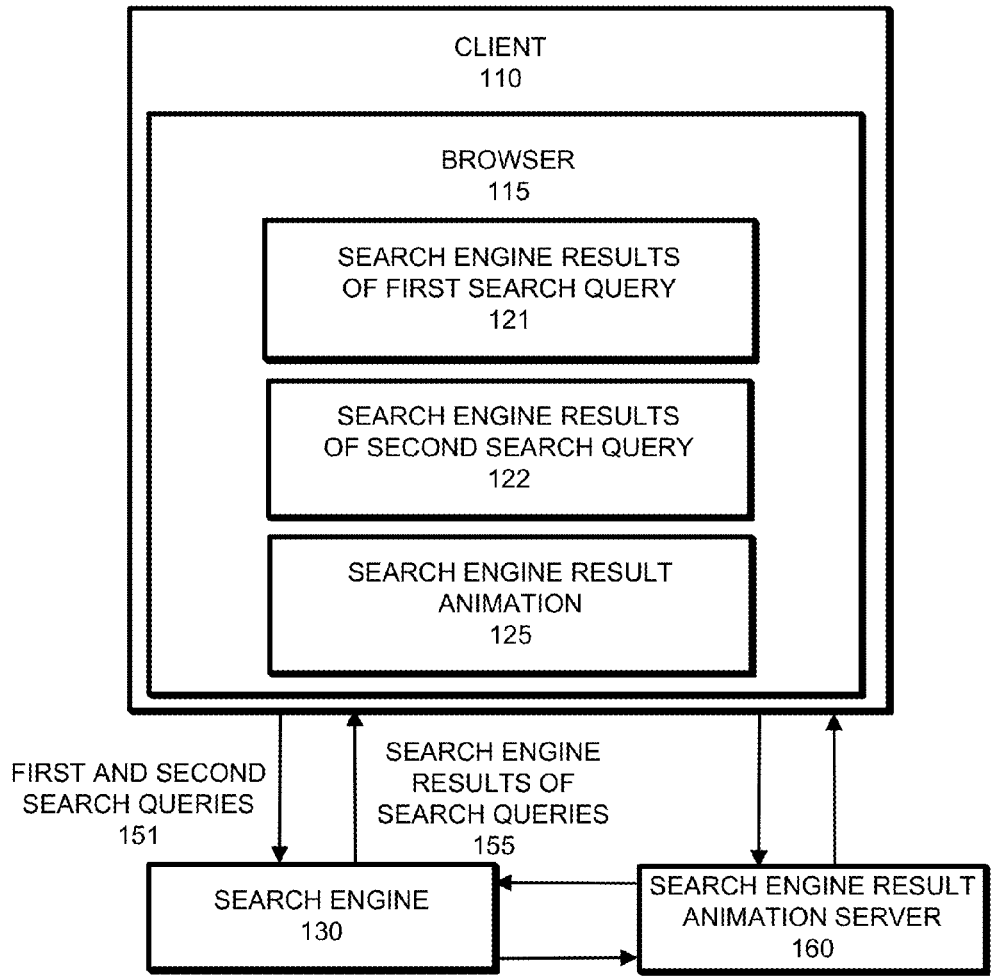
FIG. 1 is a block diagram of an example overall architecture, including a client system with a web browser that displays an animated transition and a search engine providing search engine results.

FIG. 1 is a block diagram of an example overall architecture, including a client with a web browser and a search engine providing search engine results.

The client 110 has a web browser 115 that displays an animated transition. The client 110 sends first and second search queries 151 to a search engine 130. The search engine 130 returns search engine results 155, displayed at the client as search engine results of the first search query 121 and search engine results of the first search query 122. The search engine result animation 125 shows a transition between the sets of search engine results.

The underlying work supporting the animated transition can be performed at the client 110, the search engine 130 or other server 160, or a combination. The server 160 can send instructions to the client 110, for example precomputed Flash or Javascript code, which when executed by the client 110 perform the animated transition. The client 110 can execute code, which can be the code sent from the server 160 or previously installed code, for example Javascript code or a web browser extension. Details about the animated transitions are discussed below.

Figure 2:
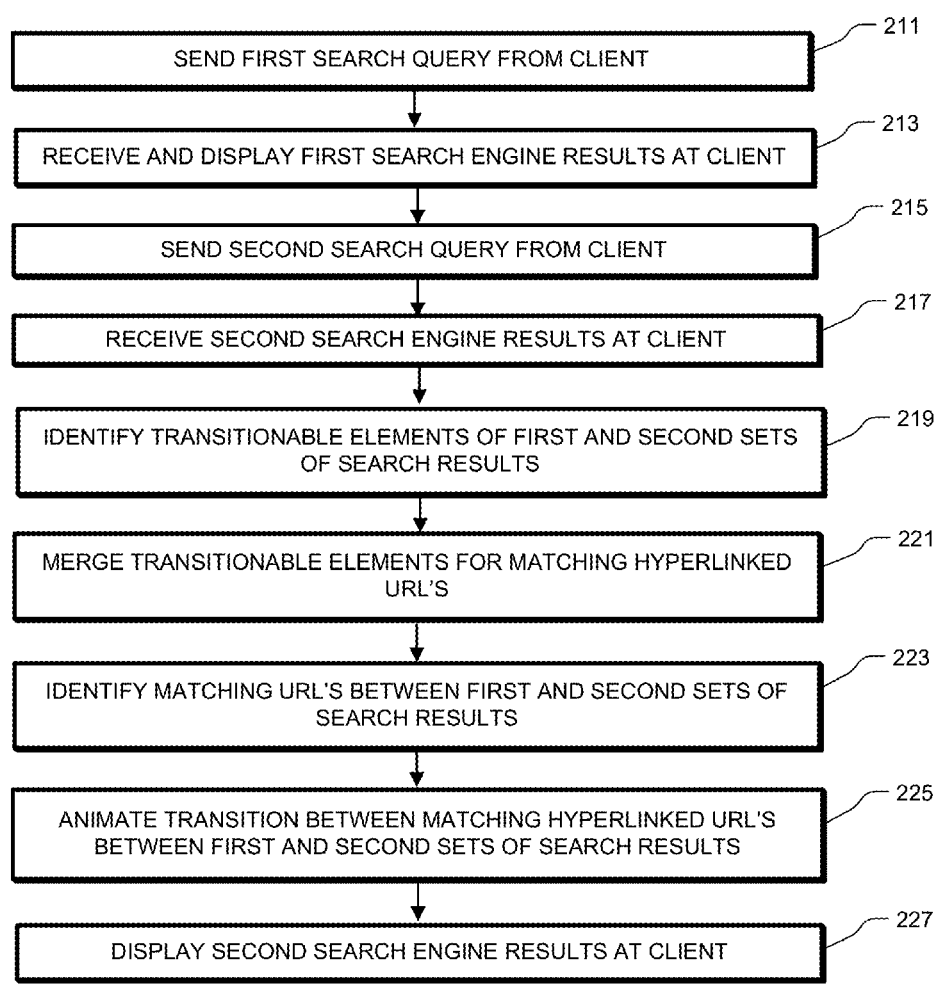
FIG. 2 is an example process flow of animating transitions between search results.

FIG. 2 is an example process flow of animating transitions between search results. The order of this process flow is an example and can be reordered.

At 211 a first search query is sent from the client to a search engine. At 213 the first search engine results are received by the client and displayed. At 215 a second search query is sent from the client to the search engine. At 217 the second search engine results are received by the client.

The following parts of the process flow can be performed at the client, the server, or combination of the client and server. At 219 transitionable elements are identified from the first and second search engine results. Transitionable elements are hyperlinks for the hyperlinked URLs, or Uniform Resource Locators, in the search engine results that are candidates for an animated transition between the first and second search engine results. The process of identifying candidate hyperlinked URLs is further discussed in connection with FIG. 3.

Figure 5:
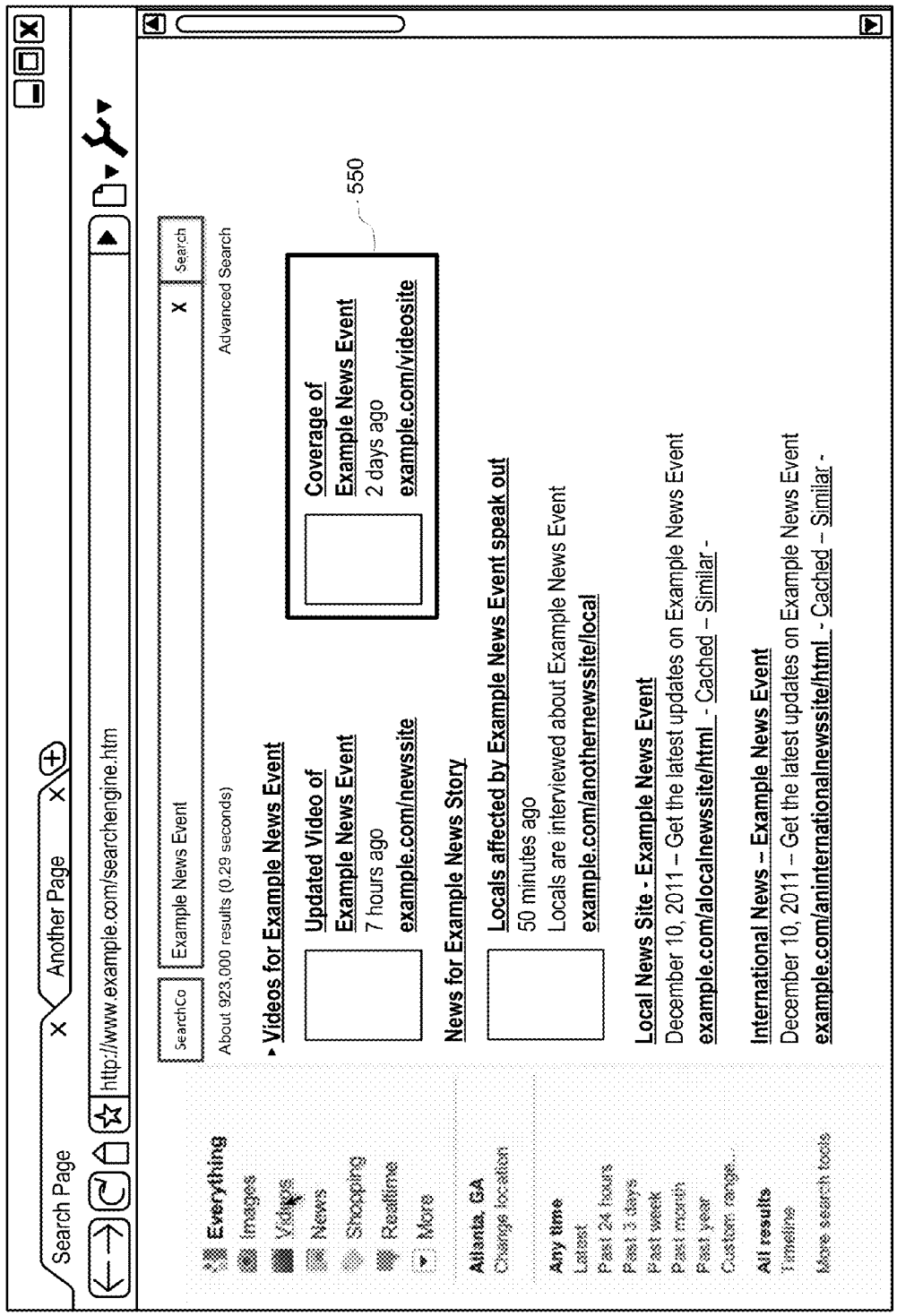
FIGS. 5-7 are a series of screen shots showing an example of an animated transition between search engine results.
Figure 6:
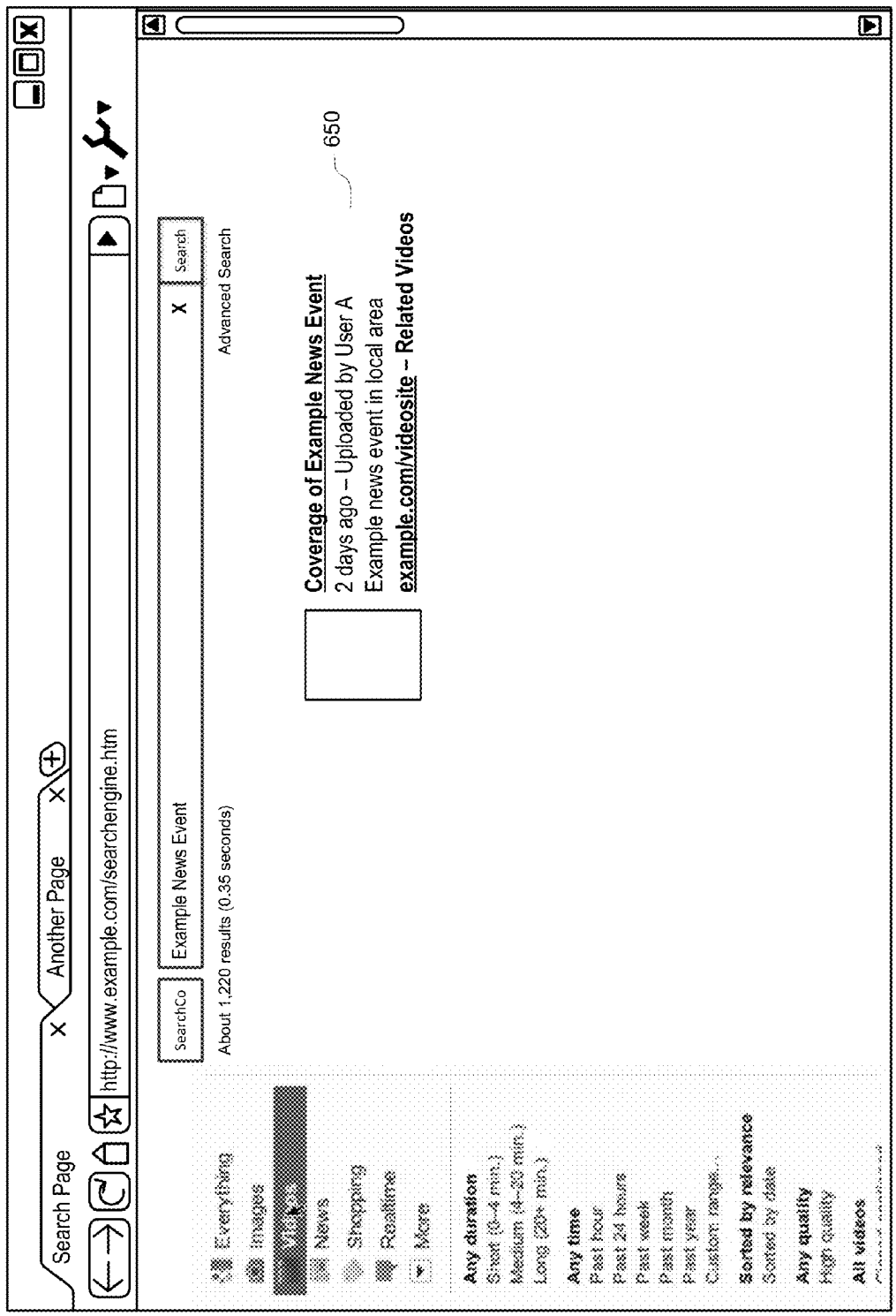
Figure 7:
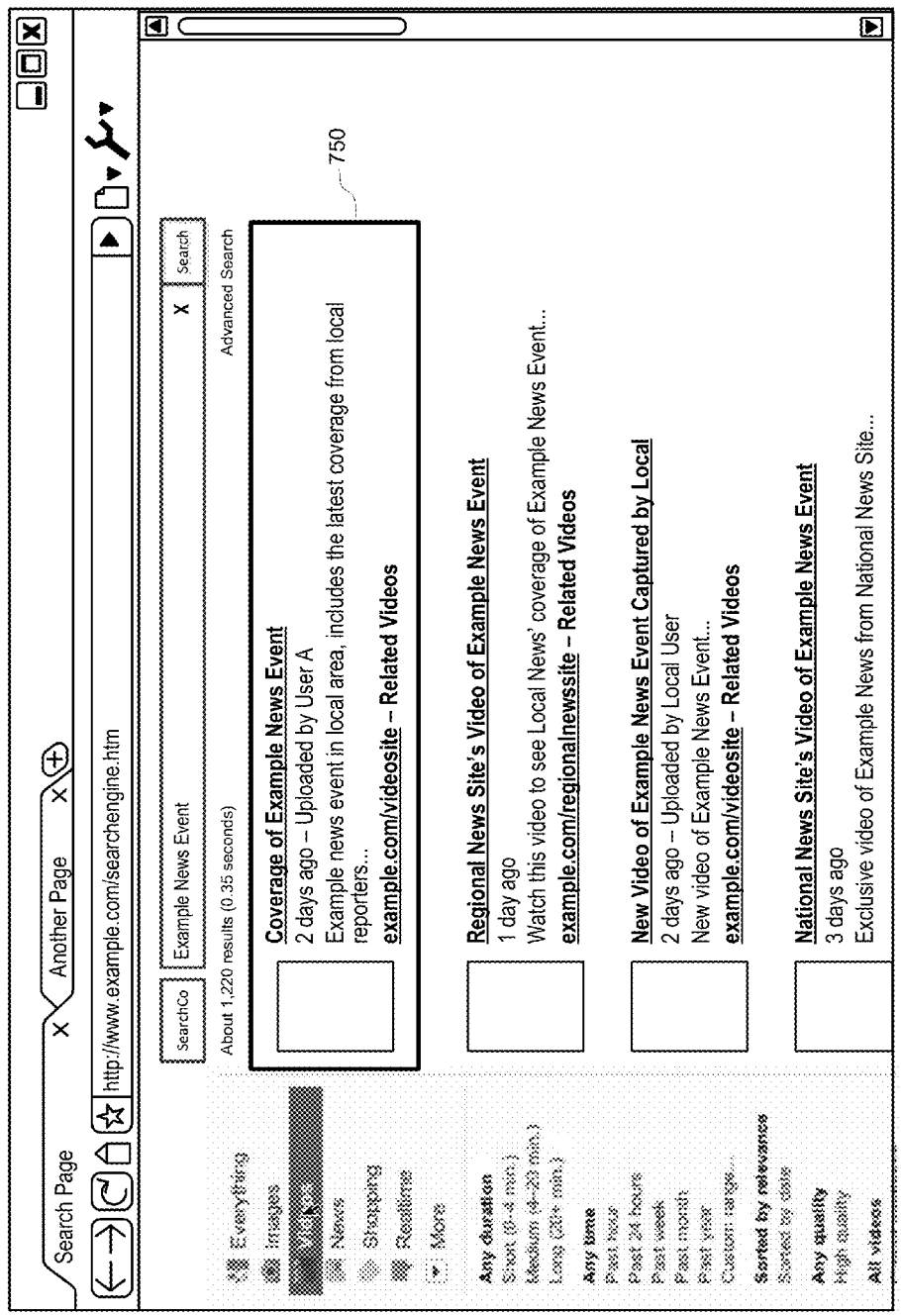

Identifying a transitionable element is nontrivial, particularly for search results that are actually groupings of multiple individual results. In such cases, multiple transitionable elements are merged into a single transitionable element; at 221 transitionable elements from the hyperlinks to hyperlinked URLs that match each other within the first set of search results are merged, and transitionable elements from the hyperlinks to hyperlinked URLs that match each other within the second set search results are merged. For example, merging combines multiple URLs that are part of the same search result into a single transitionable element. An example of such merging is shown in FIGS. 5-7, discussed below. The process of merging transitionable elements is further discussed in connection with FIG. 4.

At 223 transitionable element URLs that match between the first and second sets of search results are identified. A subsequent animated transition visually indicates URLs that match between the older first set of search results and the newer second set of search results.

At 225 the animated transition is performed between the remaining transitionable element URLs that match between the first and second sets of search results. Styling elements of the hyperlinks are preserved to prevent visual discontinuity during the animated transition. To prevent a visual discontinuity at the end of the visual animation, the animated original result is replaced with a copy of the target result, before the original result has reached the target position. The animated target result continues until landing at the final position at the second set of search results. Because the animated target result matches the target result at the second set of search results, there is no visual discontinuity at the end of the animated transition. An example of such visual continuity is shown in FIGS. 8-11, discussed below. At 227 following the animated transition, the client displays the second set of search engine results.

Figure 3:
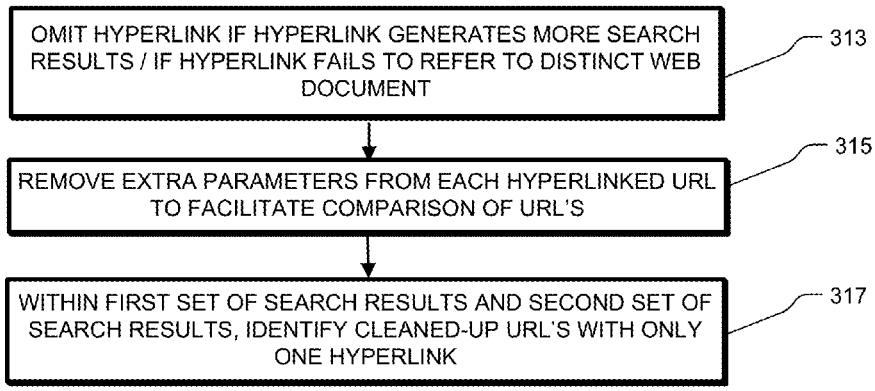
FIG. 3 is an example process flow of identifying transitionable elements in search results.

FIG. 3 is an example process flow of identifying transitionable elements in search results, providing more details about 219 in FIG. 2.

The identification of transitionable elements that are candidates for an animated transition between the first and second search engine results, assists the subsequent process of identifying URLs that match between the first and second sets of search results. At 313 the hyperlinked URLs are omitted from being candidates for animated transition, if the hyperlinked URLs generate more search results, and/or the hyperlinked URLs fail to refer to a distinct web document. For example, selected CSS or Cascading Style Sheet classes are blacklisted. An example of a blacklisted CSS class is "gl", which indicates that the hyperlinked URL is a gray line link. At 315, extra parameters are removed from each hyperlinked URL, increasing comparison accuracy to identify matching URLs, resulting in "cleaned-up" URLs. The cleaned-up URL acts as a "key" which increases accuracy of comparison with other cleaned-up URLs. At 317, cleaned-up URLs with a single hyperlink are identified. Such cleaned-up hyperlinked URLs are ready for matching between the first and second sets of search results.

The process of FIG. 3 is performed within the first set of search results, and within the second set of search results. In case there are multiple hyperlinks within the first set of search results for a cleaned-up URL, or there are multiple hyperlinks within the second set of search results for a cleaned-up URL, the merging process of FIG. 4 is performed.

Figure 4:
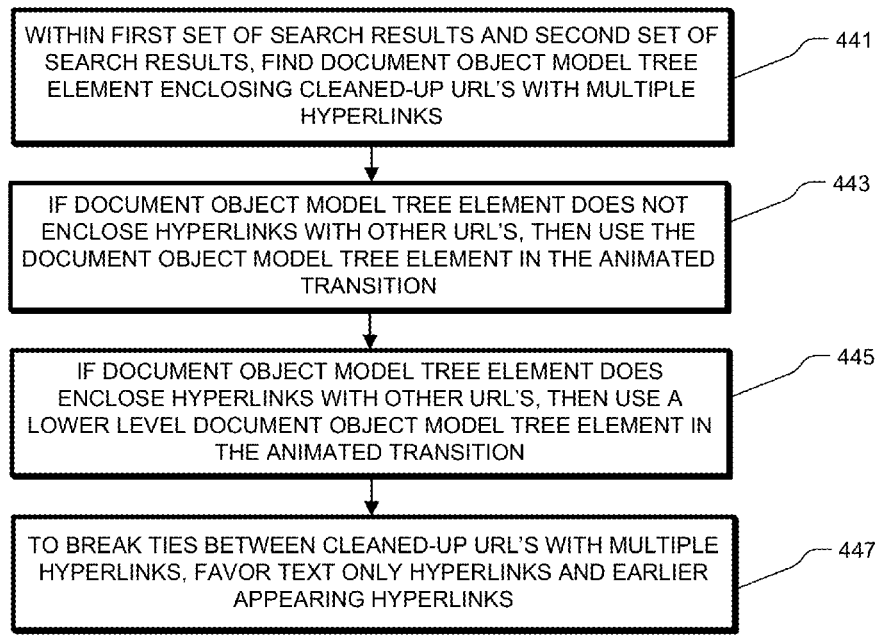
FIG. 4 is an example process flow of merging transitionable elements.

FIG. 4 is an example process flow of merging transitionable elements when multiple transitionable elements have the same cleaned-up URL, providing more details about 221 in FIG. 2. For example, a video search result contains at least two transitionable elements having the same cleaned-up URL—one containing a thumbnail of a frame from the video and one with the video's title. To identify the transitionable element for the animated transition, the lowest DOM (Document Object Model) element is identified containing both results. This lowest DOM element is deemed the transitionable element.

At 441, the DOM tree element that encloses the multiple copies of the same cleaned-up hyperlinked URL is found. At 443, if the enclosing DOM tree element does not enclose other hyperlinked URLs, then that enclosing DOM tree element is the transitionable element in the animated transition. At 445, if the enclosing DOM tree element does enclose other hyperlinked URLs, then a lower-level DOM tree element is the transitionable element in the animated transition. However, in this case there can be ties between lower-level DOM tree elements at the same tree level. At 447, to break such ties between cleaned-up URLs with multiple hyperlinked URLs, text-only hyperlinks are favored over non-text hyperlinks, and/or earlier appearing hyperlinks are favored over later appearing hyperlinks, or later appearing hyperlinks are favored over earlier appearing hyperlinks. The process of FIG. 4 is performed within the first set of search results and within the second set of search results. Such merged and cleaned-up hyperlinked URLs are ready for matching between the first and second sets of search results.

FIGS. 5-7 are a series of screen shots showing an example of an animated transition between search engine results, when a user switches from an "Everything" search results page to "Videos".

FIG. 5 is a screen shot of a first set of search engine results with "Everything" selected as a search corpus. The video entitled "Coverage of Example News Event" is transitionable element 550, which is animated in this example of an animated transition. Transitionable element 550 is a DOM tree element that encloses the multiple references to the same hyperlinked URL; the same URL is hyperlinked to a video frame thumbnail and a text video title.

FIG. 6 is a screen shot of an intermediate point of an animated transition from the first set of search engine results in FIG. 5 to the second set of search engine results in FIG. 7. The transitionable element 650 is at an intermediate point between the origin point in FIG. 5 and the destination point in FIG. 7. The first set of search engine results are removed by fading or without fading, and the animated transition occurs on a plain background. After the animated transition, the second set of search engine results fade in or appear without fading in.

Other examples of ways to replace the first set of search engine results with the second set of search engine results, in combination with the animated transition, include: replacing the first set of search engine results with the second set of search engine results and then performing the animated transition; performing a cross-fade between the first set of search engine results and the second set of search engine results while performing the animated transition; and leaving the first set of search engine results in place until the animated transition is complete, and then replacing the first set of search engine results with the second set of search engine results.

FIG. 7 is a screen shot of the second set of search engine results that overlaps slightly with the first set, that includes transitionable element 650. The second set of search engine results are responsive to a change in search corpus. Transitionable element 650 from FIG. 6 has reached the destination point 750 of the example animated transition. Transitionable element 750 is also a DOM tree element which encloses the multiple copies of the same hyperlinked URL, including a video frame thumbnail and a text video title.

FIGS. 8-11 are another series of screen shots showing more examples of animated transitions between search engine results, when a user switches from an "Everything" search results page to "News". In this series, two animated transitions occur simultaneously.

Figure 8:
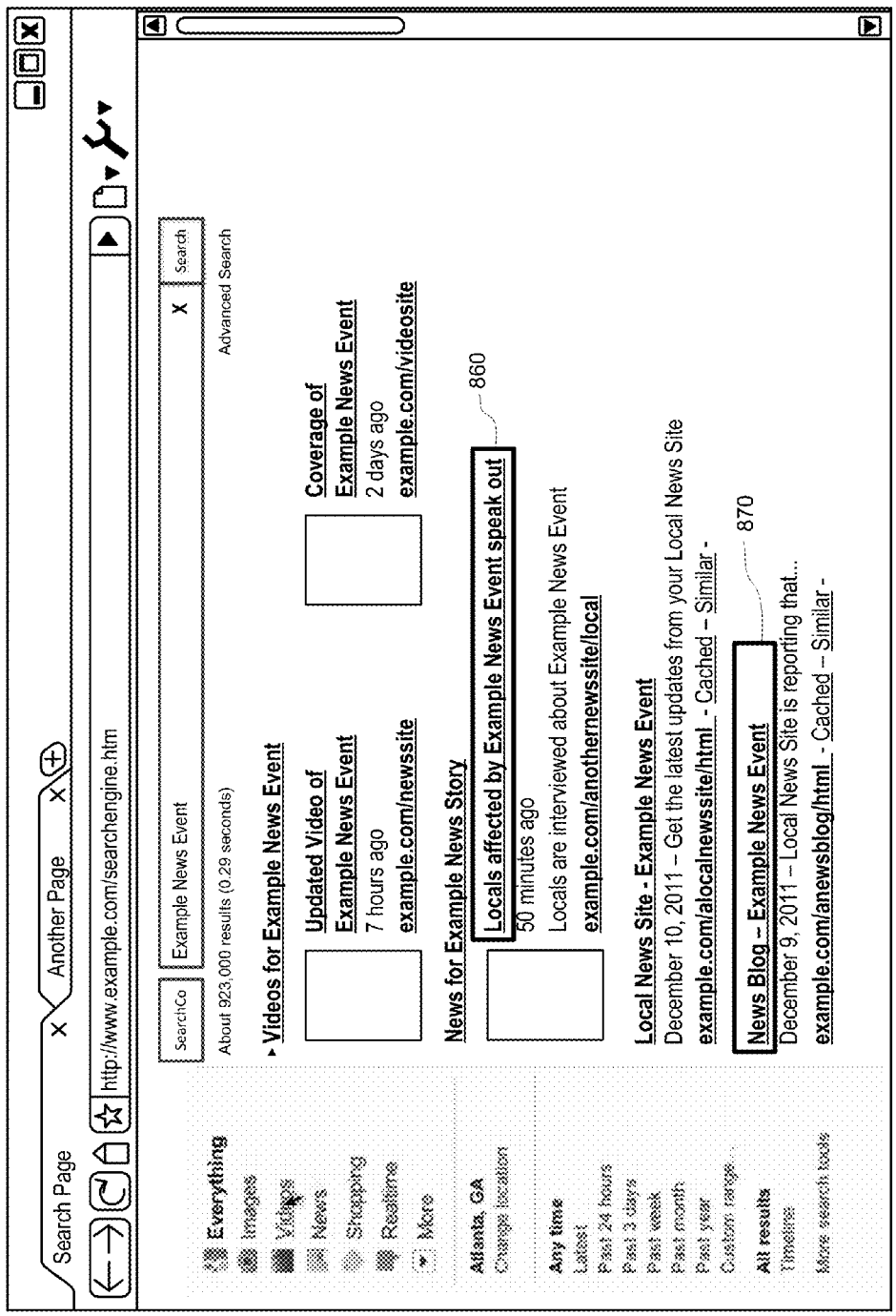
FIGS. 8-11 are another series of screen shots showing more examples of animated transitions between search engine results.

FIG. 8 is a screen shot of a first set of search engine results. The shown results are responsive to a first search query of a first search corpus. The hyperlink entitled "Locals affected by . . ." is transitionable element 860, which is the origin point of the path of a first animated transition of a hyperlink. The hyperlink entitled "News Blog—Example . . ." is transitionable element 870, which is the origin point of the path a second animated transition of a hyperlink.

Figure 9:
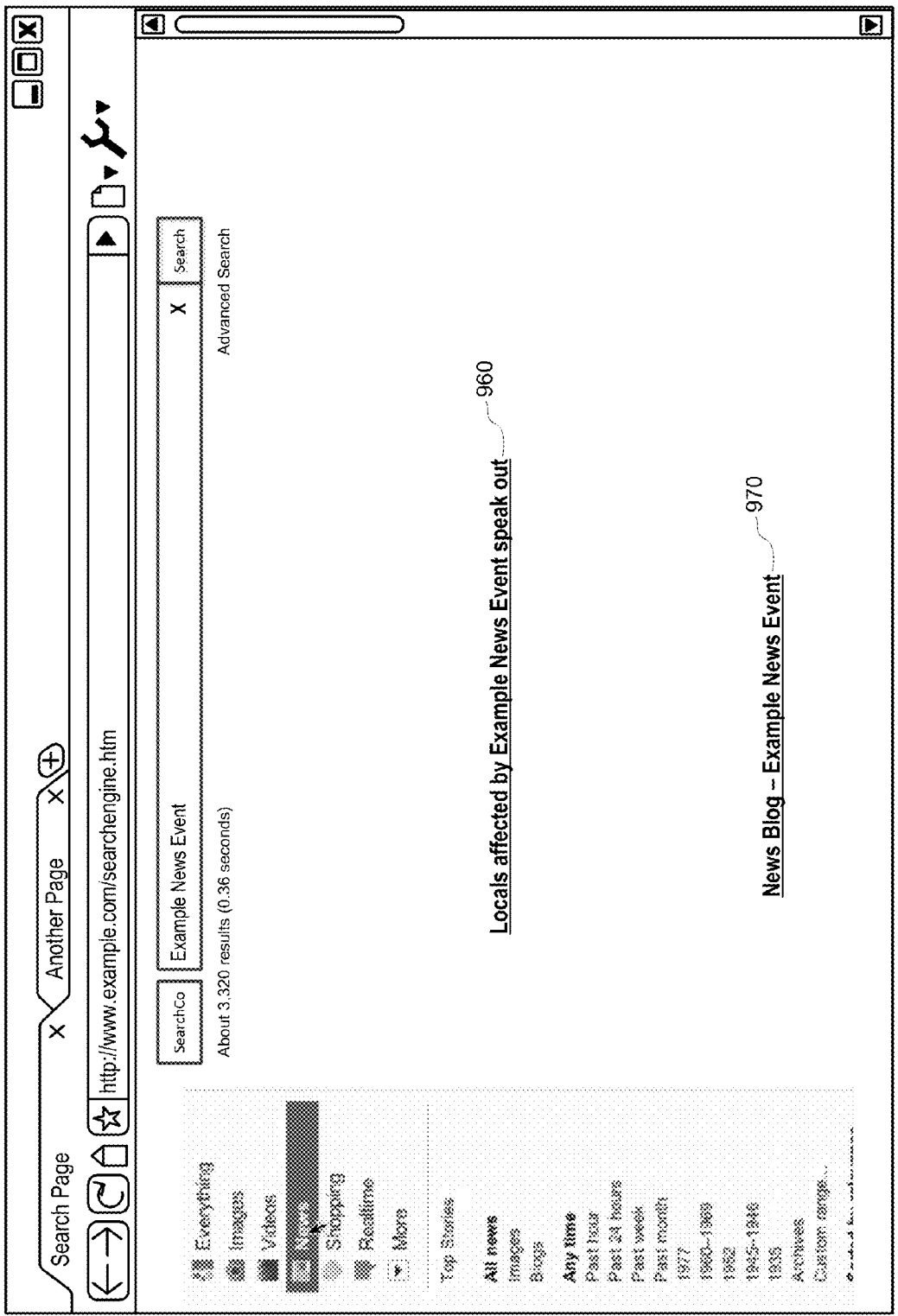
Figure 10:
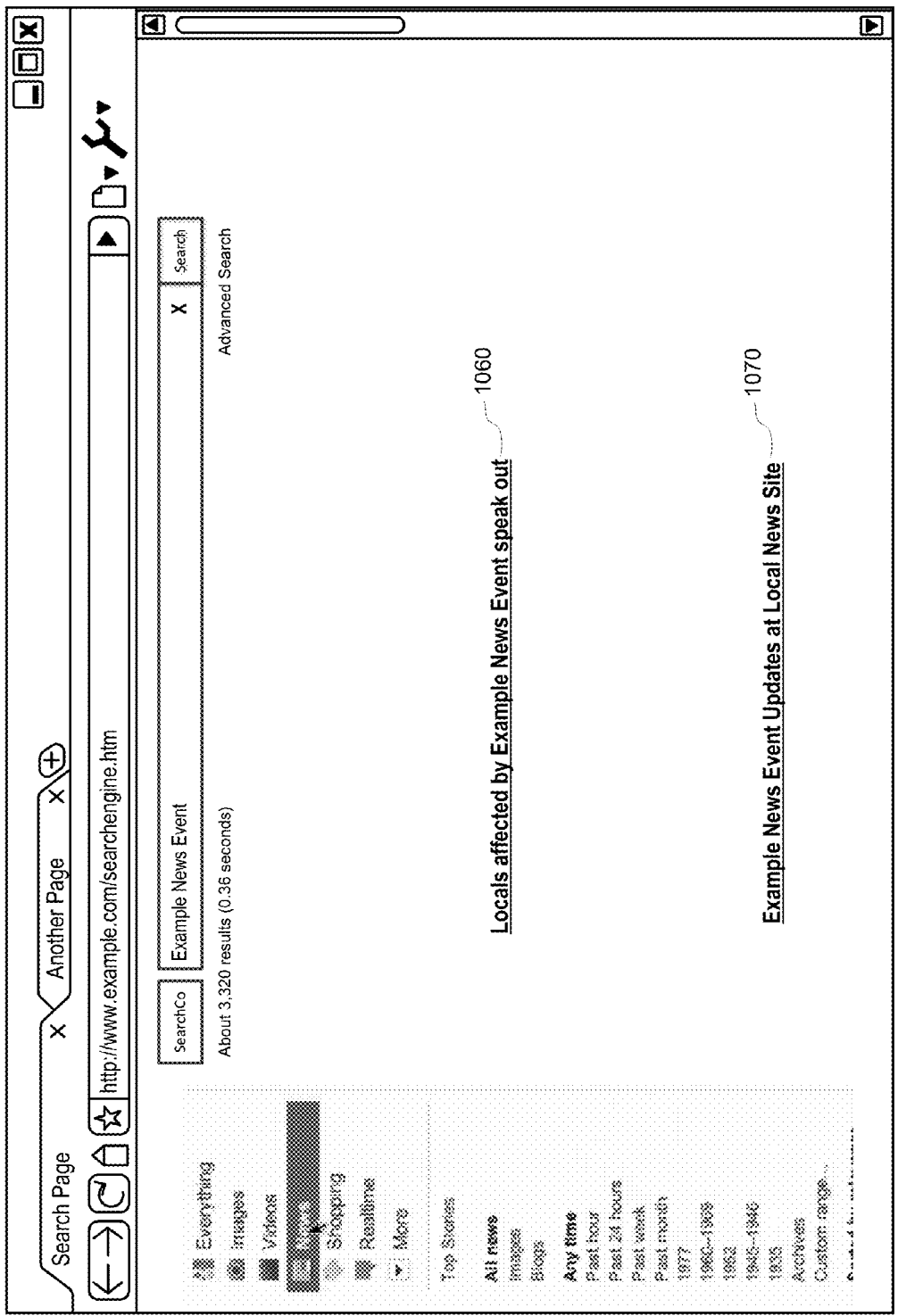
Figure 11:
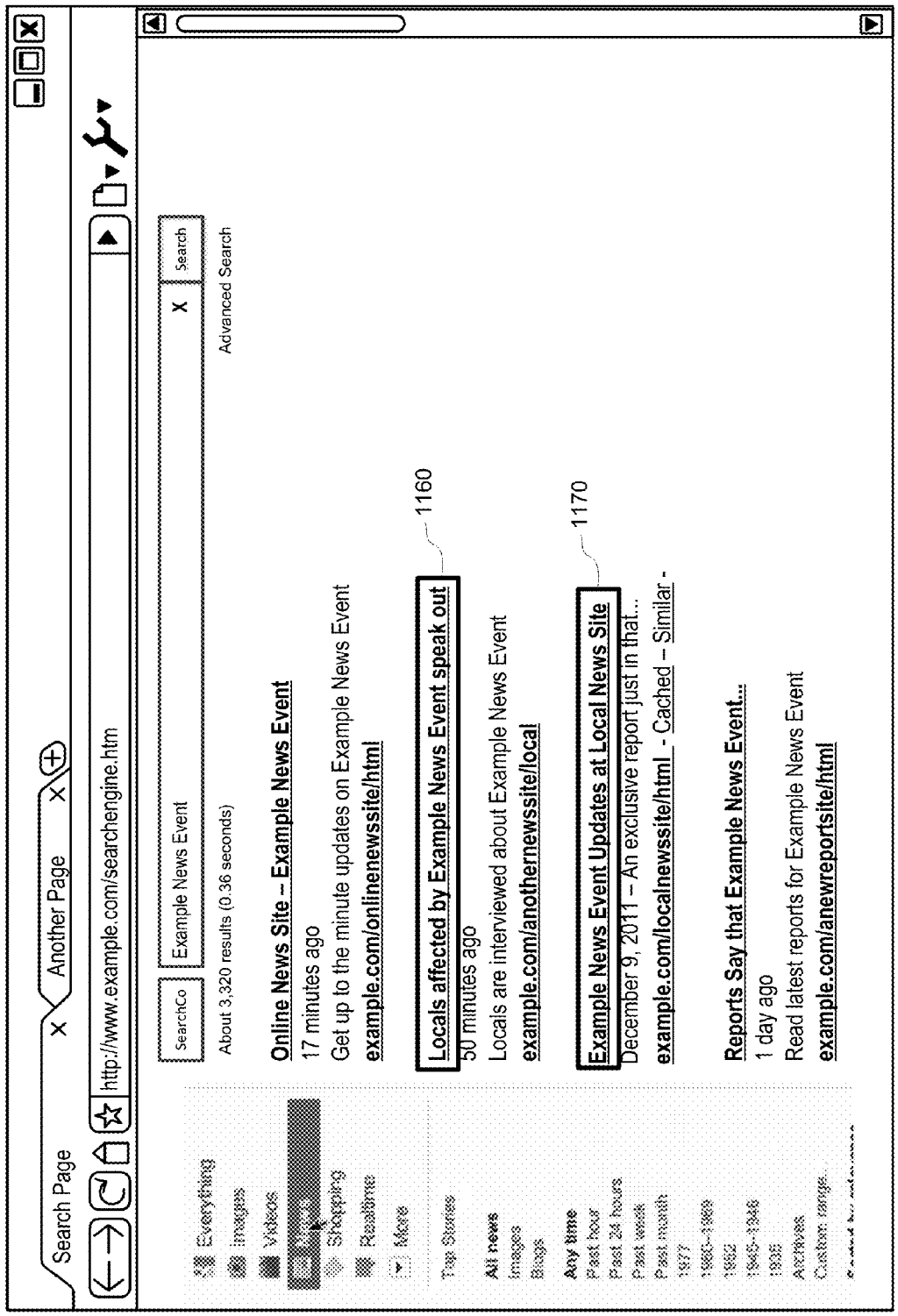

FIGS. 9 and 10 are sequential screen shots of intermediate points along the paths of animated transitions of hyperlinks from the first set of search engine results in FIG. 8 to the second set of search engine results in FIG. 11. Between FIGS. 9 and 10, in the first animated transition, animated original result 960 is replaced with an animated target result 1060. Between FIGS. 9 and 10, in the second animated transition, animated original result 970 is replaced with an animated target result 1070. Because the animated elements match the target results, there is no visual discontinuity at the conclusions of the animated transitions.

FIG. 11 is a screen shot of a first set of search engine results. The shown results are responsive to a second search query of a second search corpus. Transitionable element 860 is the destination point of the path of the first animated transition of a hyperlink. For the first animated transition, the source result "Locals affected by . . ." at example.com/anothernewssite/local was in an animated transition to the target result "Locals affected by . . ." at example.com/anothernewssite/local.

Transitionable element 870 is the destination point of the path of the second animated transition of a hyperlink. For the second animated transition, the source result "News Blog—Example . . ." at example.com/anewsblog/html in FIG. 8 was in an animated transition to the target result "Example News Event Updates . . ." at example.com/localnewssite/html in FIG. 11.

Figure 12:
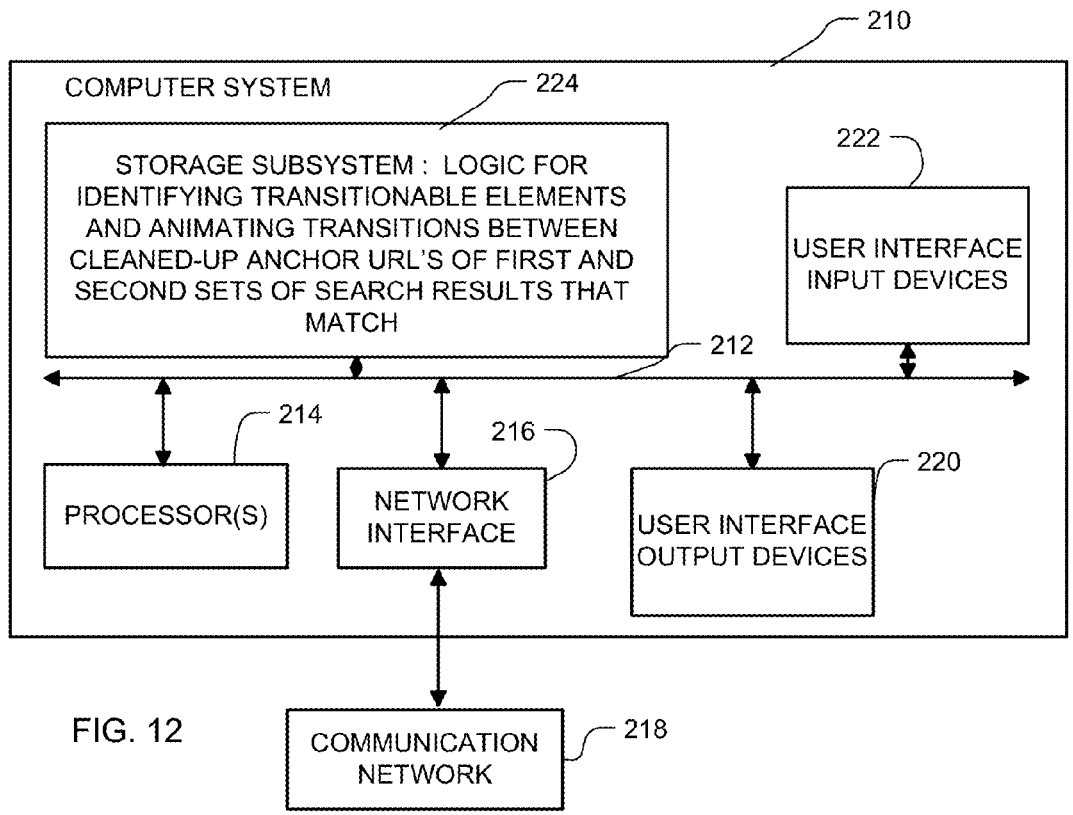
FIG. 12 is a block diagram of a computer system configured for performing animated transitions between search engine results.

FIG. 12 is a block diagram of a computer system configured for performing animated transitions between search engine results.

Computer system 1210 typically includes at least one processor 1214 which communicates with a number of peripheral devices via bus subsystem 1212. These peripheral devices may include a storage subsystem 1224, comprising for example memory devices and a file storage subsystem, user interface input devices 1222, user interface output devices 1220, and a network interface subsystem 1216. The input and output devices allow user interaction with computer system 1210. Network interface subsystem 1216 provides an interface to outside networks, including an interface to communication network 1218, and is coupled via communication network 1218 to corresponding interface devices in other computer systems. Communication network 1218 may comprise many interconnected computer systems and communication links. These communication links may be wireline links, optical links, wireless links, or any other mechanisms for communication of information. While in one embodiment, communication network 1218 is the Internet, in other embodiments, communication network 1218 may be any suitable computer network.

User interface input devices 1222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 1210 or onto communication network 1218.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1210 to the user or to another machine or computer system.

Storage subsystem 1224 stores the basic programming and data constructs that provide the functionality of some or all of the tools described herein, including the logic for performing animated transitions between search engine results. These software modules are generally executed by processor 1214 alone or in combination with other processors.

Memory used in the storage subsystem can include a number of memories including a main random access memory (RAM) for storage of instructions and data during program execution and a read only memory (ROM) in which fixed instructions are stored. A file storage subsystem can provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem in the storage subsystem 1224, or in other machines accessible by the processor.

Bus subsystem 1212 provides a mechanism for letting the various components and subsystems of computer system 1210 communicate with each other as intended. Although bus subsystem 1212 is shown schematically as a single bus, alternative embodiments of the bus subsystem may use multiple busses.

Computer system 1210 can be of varying types including a personal computer, a portable computer, a workstation, a computer terminal, a network computer, a television, a mainframe, or any other data processing system or computing device. Due to the ever-changing nature of computers and networks, the description of computer system 1210 depicted in FIG. 12 is intended only as a specific example for purposes of illustrating example embodiments. Many other configurations of computer system 1210 are possible having more or less components than the computer system depicted in FIG. 12.

Figure 13:
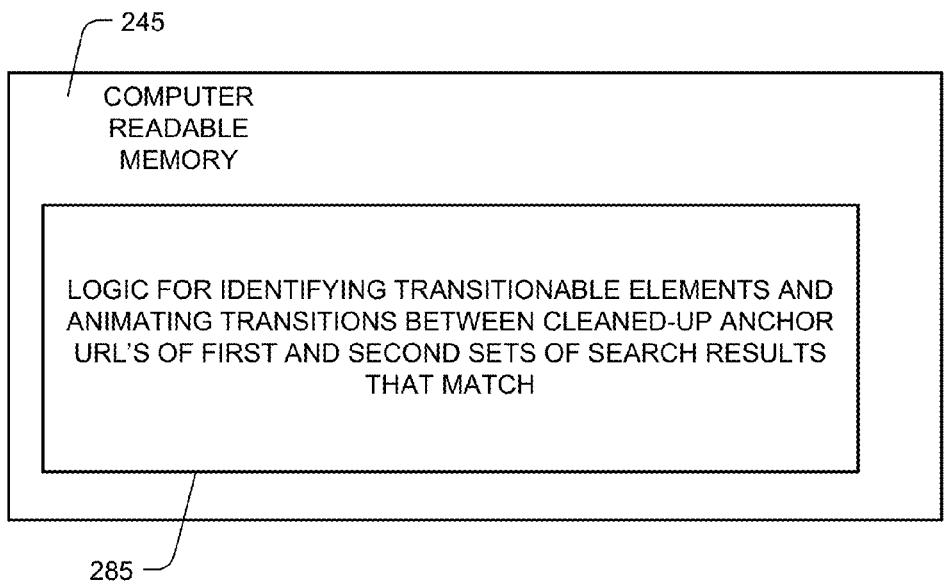
FIG. 13 is a diagram of a computer readable memory with logic for performing animated transitions between search engine results.

FIG. 13 is a diagram of a computer readable memory with logic for performing animated transitions between search engine results in a computer readable memory 245. The memory 245 can comprise a medium for example associated with file storage subsystem 224, and/or with network interface subsystem 216, or can comprise a data storage medium in a separate device. The medium used for the computer readable memory 245 can be a non-transitory medium, such as a hard disk, a floppy disk, a CDROM, an integrated circuit memory device, an optical medium, and removable media cartridge. The logic as described herein can also be embodied by data coded on a transitory medium, such as a radio communication channel.

While new technology is disclosed by reference to the preferred embodiments and examples detailed above, it is understood that these examples are intended in an illustrative rather than in a limiting sense.

It is contemplated that modifications and combinations will readily occur to those skilled in the art, which modifications and combinations will be within the spirit of the invention and the scope of the following claims.

The invention claimed is:

1. A method of visually indicating relationships between different sets of search results including a first plurality of search results responsive to a first search engine query from a client system and a second plurality of search results responsive to a second search engine query from the client system, including:
    a server sending instructions to the client system, the instructions executable by the client system to indicate hyperlinks to hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results; and
    omitting, from the animated transition, one or more hyperlinked Uniform Resource Locators that fail to refer to a distinct web document.

2. The method of claim 1, further comprising:
    identifying the hyperlinked Uniform Resource Locators common to the first plurality of search results and the second plurality of search results.

3. The method of claim 1, further comprising:
    omitting, from the animated transition, one or more hyperlinked Uniform Resource Locators that generate an additional plurality of search results.

4. The method of claim 1, wherein the animated transition from the first plurality of search results to the second plurality of search results reduces visual discontinuity by changing a visual appearance of an animated element to match a destination hyperlink in the second plurality of search results prior to the animated element reaching the destination hyperlink.

5. The method of claim 1, wherein the first search engine query and the second search engine query are directed at different search corpuses, and the animated transition indicates the hyperlinks to hyperlinked Uniform Resource Locators common to the different search corpuses.

6. The method of claim 1, wherein identifying hyperlinked Uniform Resource Locators common to the first plurality of search results and the second plurality of search results, includes:
    increasing accuracy of comparison among the hyperlinked Uniform Resource Locators by removing parameters from the hyperlinked Uniform Resource Locators of the first plurality of search results and the second plurality of search results.

7. The method of claim 1, further including:
    within the first plurality of search results and within the second plurality of search results, searching for multiple instances of a same hyperlinked Uniform Resource Locator to select one of the multiple instances for the animated transition.

8. A method of visually indicating relationships between different sets of search results including a first plurality of search results responsive to a first search engine query from a client system and a second plurality of search results responsive to a second search engine query from the client system, including:
    a server sending instructions to the client system, the instructions executable by the client system to indicate hyperlinks to hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results;
    within the first plurality of search results and within the second plurality of search results, searching for multiple instances of a same hyperlinked Uniform Resource Locator to select one of the multiple instances for the animated transition; and
    in the animated transition, animating a Document Object Model tree element enclosing the multiple instances of the same hyperlinked Uniform Resource Locator.

9. A method of visually indicating relationships between different sets of search results including a first plurality of search results responsive to a first search engine query from a client system and a second plurality of search results responsive to a second search engine query from the client system, including:
    a server sending instructions to the client system, the instructions executable by the client system to indicate hyperlinks to hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results;
    within the first plurality of search results and within the second plurality of search results, searching for multiple instances of a same hyperlinked Uniform Resource Locator to select one of the multiple instances for the animated transition; and in response to finding a first Document Object Model tree element that encloses the multiple instances of the same hyperlinked Uniform Resource Locator and that also encloses a different hyperlinked Uniform Resource Locator, animating a second Document Object Model tree element at a lower level than the first Document Object Model tree element.

10. A method of visually indicating relationships between different sets of search results including a first plurality of search results responsive to a first search engine query from a client system and a second plurality of search results responsive to a second search engine query from the client system, including:

a server sending instructions to the client system, the instructions executable by the client system to indicate hyperlinks to hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results;

within the first plurality of search results and within the second plurality of search results, searching for multiple instances of a same hyperlinked Uniform Resource Locator to select one of the multiple instances for the animated transition; and favoring text-only instances of the same hyperlinked Uniform Resource Locator over non-text-only instances of the same hyperlinked Uniform Resource Locator for use in the animated transition.

11. A method of visually indicating relationships between different sets of search results including a first plurality of search results responsive to a first search engine query from a client system and a second plurality of search results responsive to a second search engine query from the client system, including:

the client system indicating hyperlinks to the hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results; and omitting, from the animated transition, one or more hyperlinked Uniform Resource Locators that fail to refer to a distinct web document.

12. The method of claim 11, further comprising:
identifying the hyperlinked Uniform Resource Locators common to the first plurality of search results and the second plurality of search results.

13. The method of claim 11, further comprising:
omitting, from the animated transition, one or more hyperlinked Uniform Resource Locators that generate an additional plurality of search results.

14. The method of claim 11, wherein the animated transition from the first plurality of search results to the second plurality of search results reduces visual discontinuity by changing a visual appearance of an animated element to match a destination hyperlink in the second plurality of search results prior to the animated element reaching the destination hyperlink.

15. The method of claim 11, wherein the first search engine query and the second search engine query are directed at different search corpuses, and the animated transition indicates the hyperlinks to hyperlinked Uniform Resource Locators common to the different search corpuses.

16. The method of claim 11, wherein identifying hyperlinked Uniform Resource Locators common to the first plurality of search results and the second plurality of search results, includes:

increasing accuracy of comparison among the hyperlinked Uniform Resource Locators by removing parameters from the hyperlinked Uniform Resource Locators of the first plurality of search results and the second plurality of search results.

17. The method of claim 11, further including:
within the first plurality of search results and within the second plurality of search results, searching for multiple instances of a same hyperlinked Uniform Resource Locator to select one of the multiple instances for the animated transition.

18. A method of visually indicating relationships between different sets of search results including a first plurality of search results responsive to a first search engine query from a client system and a second plurality of search results responsive to a second search engine query from the client system, including:

the client system indicating hyperlinks to the hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results;

within the first plurality of search results and within the second plurality of search results, searching for multiple instances of a same hyperlinked Uniform Resource Locator to select one of the multiple instances for the animated transition; and in the animated transition, animating a Document Object Model tree element enclosing the multiple instances of the same hyperlinked Uniform Resource Locator.

19. A method of visually indicating relationships between different sets of search results including a first plurality of search results responsive to a first search engine query from a client system and a second plurality of search results responsive to a second search engine query from the client system, including:

the client system indicating hyperlinks to the hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results;

within the first plurality of search results and within the second plurality of search results, searching for multiple instances of a same hyperlinked Uniform Resource Locator to select one of the multiple instances for the animated transition; and in response to finding a first Document Object Model tree element that encloses the multiple instances of the same hyperlinked Uniform Resource Locator and that also encloses a different hyperlinked Uniform Resource Locator, animating a second Document Object Model tree element at a lower level than the first Document Object Model tree element.

20. A method of visually indicating relationships between different sets of search results including a first plurality of search results responsive to a first search engine query from a client system and a second plurality of search results responsive to a second search engine query from the client system, including:

the client system indicating hyperlinks to the hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results;

within the first plurality of search results and within the second plurality of search results, searching for multiple instances of a same hyperlinked Uniform Resource Locator to select one of the multiple instances for the animated transition; and favoring text-only instances of the same hyperlinked Uniform Resource Locator over non-text-only instances of the same hyperlinked Uniform Resource Locator for use in the animated transition.

21. A non-transitory computer readable medium having instructions stored thereon which, when executed by one or more computers, cause the one or more computers to perform operations comprising:

visually indicating relationships between different sets of search results including a first plurality of search results responsive to a first search engine query from a client system and a second plurality of search results responsive to a second search engine query from the client system comprising:

indicating the hyperlinked Uniform Resource Locators common to the first plurality of search results and the second plurality of search results with an animated transition of the hyperlinks moving along paths having origins at positions of the hyperlinks in the first plurality of search results and destinations at positions of the hyperlinks in the second plurality of search results; and omitting, from the animated transition, one or more hyperlinked Uniform Resource Locators that fail to refer to a distinct web document.

* * * * *